United States Patent
Goh et al.

(10) Patent No.: US 9,001,229 B2
(45) Date of Patent: Apr. 7, 2015

(54) MULTIPLE SENSOR INPUT DATA SYNTHESIS

(71) Applicant: Microsoft Corporation, Redmond, WA (US)

(72) Inventors: Chun Beng Goh, Bellevue, WA (US); Raymond Xue, Issaquah, WA (US); Thomas C. Oliver, Windsor, CO (US); Stephen C. Cooper, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/053,388

(22) Filed: Oct. 14, 2013

(65) Prior Publication Data

US 2014/0132714 A1 May 15, 2014

Related U.S. Application Data

(63) Continuation of application No. 13/181,254, filed on Jul. 12, 2011, now Pat. No. 8,558,907, which is a continuation of application No. 11/818,737, filed on Jun. 15, 2007, now Pat. No. 8,009,200.

(51) Int. Cl.
*H04N 5/225* (2006.01)
*H04N 5/232* (2006.01)
*H04N 13/00* (2006.01)
*H04N 13/02* (2006.01)

(52) U.S. Cl.
CPC ....... *H04N 5/23229* (2013.01); *H04N 13/0003* (2013.01); *H04N 13/02* (2013.01)

(58) Field of Classification Search
USPC ................. 348/208.14, 218.1, 239, 333.05
See application file for complete search history.

(56) References Cited

U.S. PATENT DOCUMENTS

| | | | |
|---|---|---|---|
| 5,159,455 | A | 10/1992 | Cox et al. |
| 5,303,342 | A | 4/1994 | Edge |
| 5,668,595 | A | 9/1997 | Katayama et al. |
| 5,892,929 | A | 4/1999 | Welker |
| 6,195,116 | B1 | 2/2001 | Lee |
| 6,288,742 | B1 | 9/2001 | Ansari et al. |

(Continued)

OTHER PUBLICATIONS

Wandell et al.,"Common Principles of Image Acquisition Systems and Biological Vision", In Proceedings of the IEEE, vol. 90, No. 1, Jan. 2002, pp. 5-17.

(Continued)

*Primary Examiner* — Gevell Selby
(74) *Attorney, Agent, or Firm* — Miia Sula; Judy Yee; Micky Minhas

(57) ABSTRACT

New systems and methods are hereby provided that inherently and naturally resolve the challenges of synthesizing coordinated inputs from multiple cameras. For example, a multi-sensor mediator may collect the input data from multiple sensors, and generate a composite signal that encodes the combined data from the different sensors. The multi-sensor mediator may then relay the composite signal to a sensor controller, as if the signal were coming from a single sensor. A computing device that receives the input from the sensor controller may then generate an output based on the composite signal, which may include processing the composite signal to combine the separate signals from the different sensors, such as to provide a stereo image output, for example. The multi-sensor mediator makes such an output possible by ensuring coordinated input and processing of the input from the multiple sensors, for example.

20 Claims, 7 Drawing Sheets

(56) References Cited

U.S. PATENT DOCUMENTS

| | | |
|---|---|---|
| 6,522,787 B1 * | 2/2003 | Kumar et al. ............ 382/268 |
| 6,535,240 B2 | 3/2003 | Yang et al. |
| 6,724,417 B1 | 4/2004 | Hillis et al. |
| 6,788,338 B1 | 9/2004 | Dinev et al. |
| 6,937,270 B1 | 8/2005 | Dong et al. |
| 6,970,579 B1 | 11/2005 | Thornton |
| 7,061,526 B2 | 6/2006 | Nakayama et al. |
| 7,064,779 B1 | 6/2006 | Pine |
| 7,292,264 B2 | 11/2007 | Itokawa |
| 7,787,013 B2 | 8/2010 | Yoshida |
| 8,009,200 B2 | 8/2011 | Goh et al. |
| 8,558,907 B2 | 10/2013 | Goh |
| 2002/0186212 A1 | 12/2002 | Matsumoto et al. |
| 2004/0075741 A1 | 4/2004 | Berkey et al. |
| 2004/0247176 A1 | 12/2004 | Aucsmith et al. |
| 2004/0257453 A1 | 12/2004 | Lee et al. |
| 2005/0185047 A1 | 8/2005 | Hii |
| 2006/0077276 A1 | 4/2006 | Noguchi |
| 2006/0177124 A1 | 8/2006 | Ha |
| 2006/0209181 A1 | 9/2006 | Van Geest |
| 2006/0251382 A1 * | 11/2006 | Vronay et al. ............ 386/52 |
| 2008/0059578 A1 * | 3/2008 | Albertson et al. ............ 709/204 |
| 2008/0309774 A1 | 12/2008 | Goh |
| 2011/0267427 A1 | 11/2011 | Goh et al. |

OTHER PUBLICATIONS

"Final Office Action", U.S. Appl. No. 11/818,737, Oct. 6, 2010, 10 pages.

Wandell et al., "Multiple Capture Single Image Architecture with a CMOS Sensor", In Proceedings of the International Symposium on Multispectral Imaging and Color Reproduction for Digital, 1999, 7 pages.

"Non-Final Office Action", U.S Appl. No. 11/818,737, Jan. 5, 2011, 10 pages.

"Non-Final Office Action", U.S. Appl. No. 13/181,254, Jan. 17, 2013, 12 pages.

"Non-Final Office Action", U.S. Appl. No. 11/818,737, Oct. 6, 2009, 12 pages.

"Non-Final Office Action", U.S. Appl. No. 11/818,737, Mar. 22, 2010, 9 pages.

"Notice of Allowance", U.S. Appl. No. 11/818,737, May 3, 2011, 6 pages.

"Notice of Allowance", U.S. Appl. No. 13/181,254, Jun. 12, 2013, 7 pages.

* cited by examiner

MULTIPLE SENSOR INPUT DATA SYNTHESIS

CROSS-REFERENCE

This application is a continuation of and claims priority under 35 U.S.C. §120 to U.S. patent application Ser. No. 13/181,254, filed on Jul. 12, 2011 and titled "Multiple Sensor Input Data Synthesis," which is a continuation of and claims priority to U.S. patent application Ser. No. 11/818,737, filed on Jun. 15, 2007 and titled "Multiple Sensor Input Data Synthesis," the disclosures of which are incorporated by reference in their entirety herein.

BACKGROUND

Image sensors such as cameras and webcams are becoming ever more widely used in association with computing devices. There is a growing interest in using multiple image sensors at one time in the same setting. This can allow for the same scene to be captured from multiple vantage points, allowing a user to alternate between vantage points in a webcam experience, a game, or a video playback, or allowing multiple images to be combined to create a three-dimensional viewing experience, such as for a movie, a virtual reality application, or a webcam interaction.

However, providing two or more image sensor inputs simultaneously and synchronously over a single interface, together with control output to multiple image sensors, poses substantial challenges for the hardware and/or software that handles the input and output data. For example, one typical arrangement may include multiple universal serial bus (USB) webcams that are all meant to stream image data simultaneously to a host computer. A typical way to make this arrangement work may be to have multiple USB webcam control circuits, one connected to each of the USB webcams, with all the USB webcam control circuits connected to an embedded USB hub.

However, such an implementation would be costly for the hardware and complex for the software. For hardware, one webcam controller circuit for each webcam, plus an embedded USB hub, adds up to a significant cost. For software, each webcam controller would appear as a separate USB device, which would complicate device setup in the operating system for the user, and add processing overhead if further image processing is required on multiple input video streams. Each of the webcam controller circuits would have to negotiate with the host controller for its own USB bandwidth, reducing the efficiency of the USB bandwidth and preventing any guarantee of equal USB bandwidth among the different webcams. In some cases, one or more of the webcams might not be allocated any bandwidth at all. Unallocated or low bandwidth means no guarantee of frame to frame synchronization between the signals from the different webcams. Lack of frame synchronization would give rise to a catastrophic error mode if the software application required frame-synchronized input video from the different image sensors, such as for stereo combination of the webcam images, which would then be impossible.

The discussion above is merely provided for general background information and is not intended to be used as an aid in determining the scope of the claimed subject matter.

SUMMARY

New systems and methods are hereby provided that resolve the challenges of synthesizing coordinated inputs from multiple cameras. One illustrated embodiment provides for a method for processing coordinated inputs from multiple sensors. The method includes receiving signals representing a plurality of sensor inputs from a plurality of sensors. The method further includes generating a composite signal that encodes the plurality of sensor inputs from the plurality of sensors. The method also includes providing the composite signal to a sensor controller. The method further includes generating an output based at least in part on the composite signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
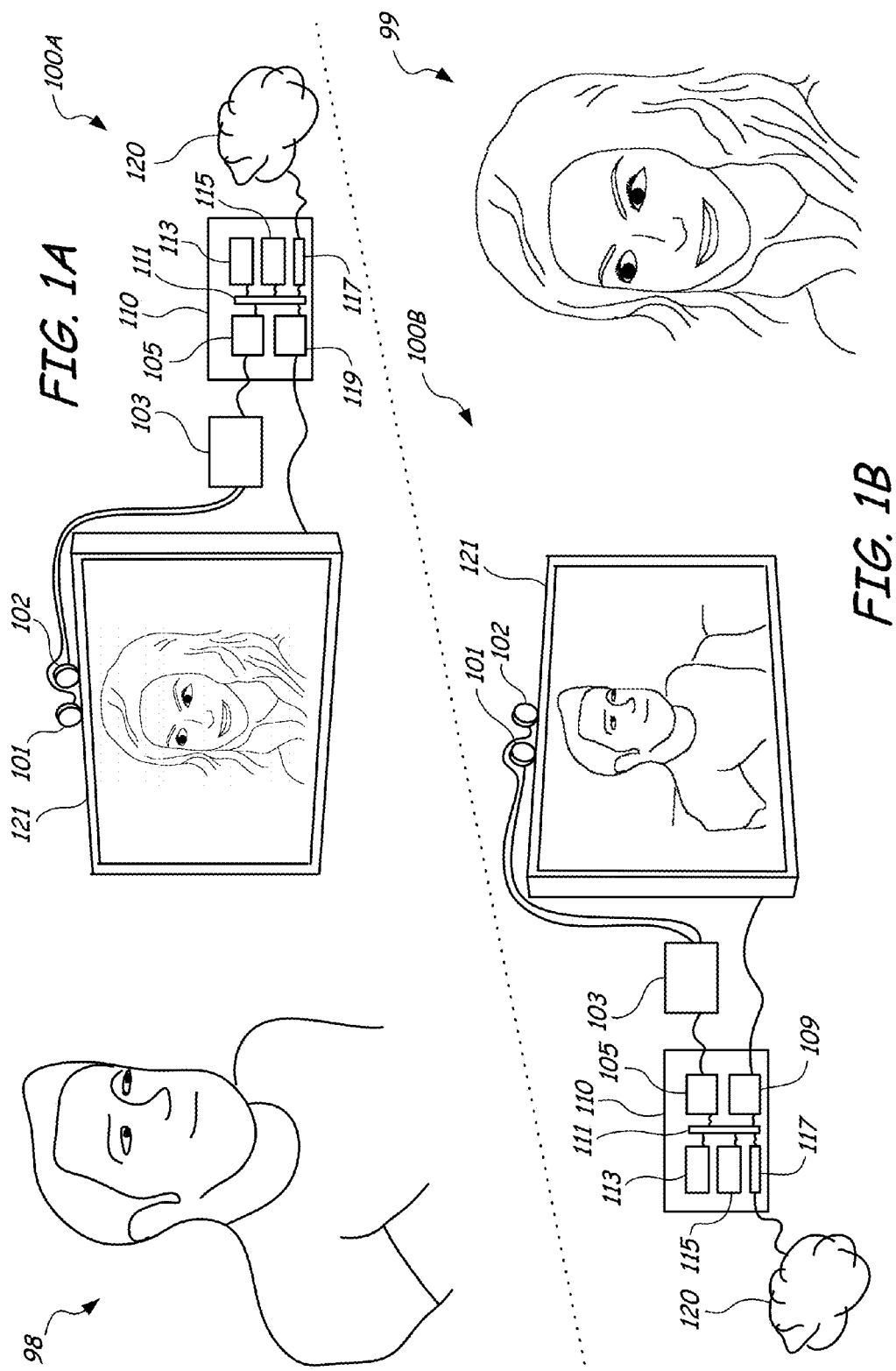
FIGS. 1A and 1B depict computing devices with multiple sensors, according to an illustrative embodiment and depicted in an illustrative user context.

FIGS. 1A and 1B depict computing systems 100A and 100B that each enable a method for processing coordinated inputs from multiple image sensors 101, according to an illustrative embodiment. Computing systems 100A and 100B may be illustrative of embodiments that include various hardware components involved with computing, input, output, and associated tasks, and executable instructions configured to be executable by computing systems, and contexts that enable method embodiments, for example. The following discussion provides further details of various illustrative embodiments. While certain illustrative system components and aspects involved with computer-implemented methods are included in this and the subsequent figures, they are intended not to indicate any limitations, but rather to provide an illustrative example the variety and broader meaning provided in the discussion and claims herein.

Computing systems 100A, 100B each includes a plurality of cameras 101, 102, connected to a multi-sensor mediator 103, which is connected to an image sensor controller 105. Each of these connections, and additional connections discussed below associated with computing systems 100A, 100B, enables communication of signals between the components thus connected. Cameras 101, 102 are image sensors that may be web cameras ("webcams") or other video cameras, for example. Cameras 101, 102 may be embodied as video graphics array (VGA) complementary metal-oxide-semiconductor (CMOS) image sensors, in this illustrative embodiment. Other embodiments may also be used, such as Super VGA (SVGA) or Extended Graphics Array (XGA) image sensors, for example.

In this embodiment, webcams 101, 102 may image a user positioned in front of video monitor 121 and cameras 101, 102, such as users 98, 99, enabling users 98 and 99 to hold a video conference call with each other. Image sensor controller 105 is connected to a system bus 111 of the computing system, which has several other computing components connected to it, such as system memory 113, processing unit 115, network interface 117, and output interface 119. Many of these components may be included within a single computing device 110, or they may be distributed through other parts of computing systems 100A, 100B or other computing resources connected by a network or other communicative connection, in different embodiments. Output interface 117 may be connected to the Internet 120 and/or to other networks. Output interface 119 may provide video output to video monitor 121 and audio output to audio speakers (not depicted), for example. These and other potential components of computing systems 100A, 100B are described in greater detail in association with FIG. 7, below.

Computing system 100A may thereby enable images of user 98 captured by cameras 101, 102 of computing system 100A to be transmitted to computing system 100B and provided as an output on video monitor 121 of computing system 100B, while computing system 100B may enable images of user 99 captured by cameras 101, 102 of computing system 100B to be transmitted to computing system 100A and provided as an output on video monitor 121 of computing system 100A, for example. Video monitors 121 thereby provide an output based ultimately on the composite signal from multi-sensor mediator 103 that reproduces to some degree the images originally received from cameras 101, 102. Such reproduction may incorporate information on a single subject imaged by more than one camera, such as by providing a stereo representation, for example.

Figure 2:
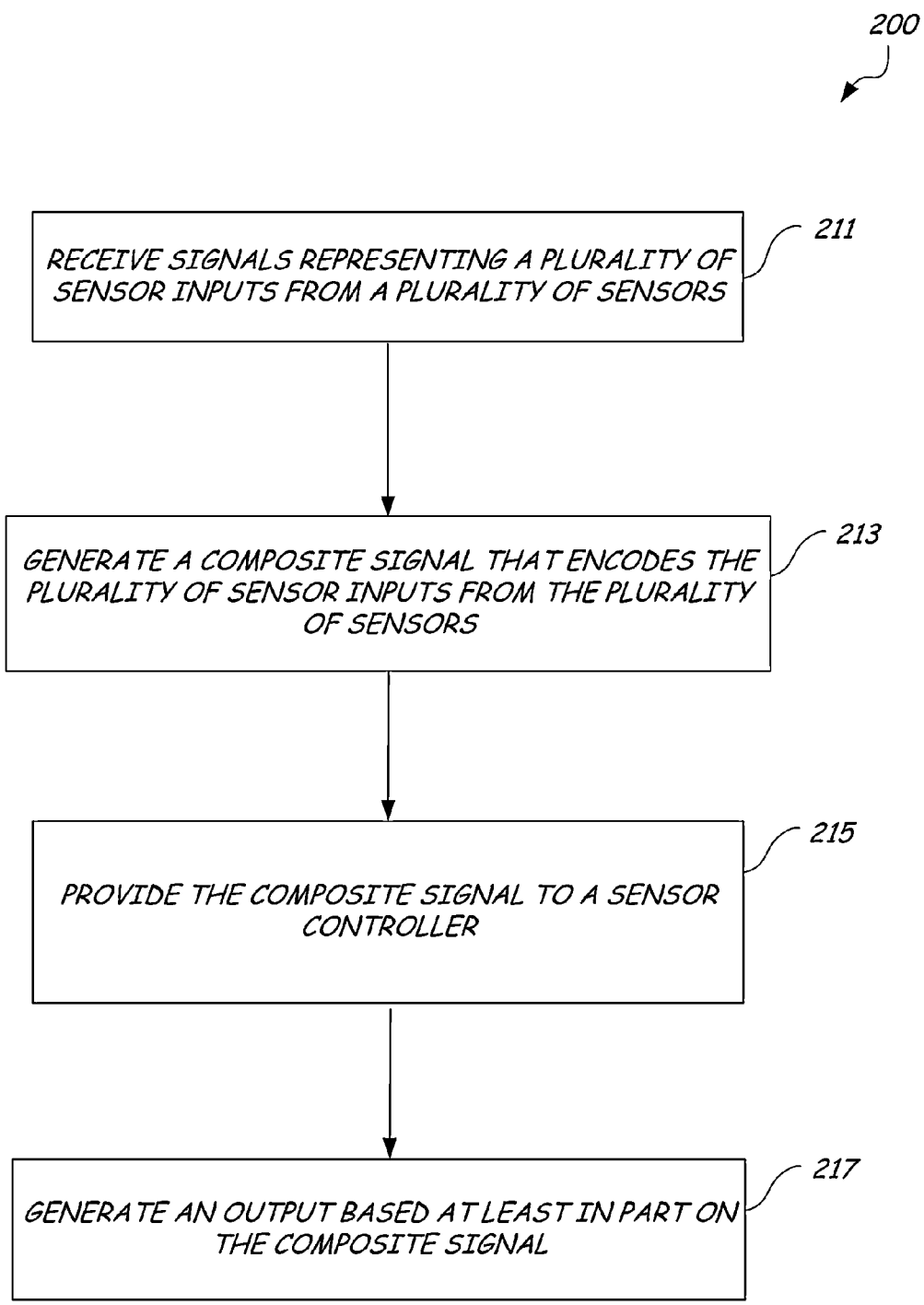
FIG. 2 depicts a method for multiple sensor input data synthesis, according to an illustrative embodiment.

Multi-sensor mediator 103 serves as an intermediary component between cameras 101, 102 and image sensor controller 105. Multi-sensor mediator 103 may be embodied in any of a variety of forms, such as a field-programmable gate array (FPGA), a complex programmable logic device (CPLD), a microcontroller, a microprocessor, a digital signal processor (DSP), or a component of the image sensor controller 105, for example. Multi-sensor controller 103 enables methods of coordinating or synthesizing the data input from multiple sensors, such as cameras 101 and 102. One such method is illustratively depicted in flowchart 200 as depicted in FIG. 2. As indicated in flowchart 200, multi-sensor mediator 103 is configured to receive signals representing a plurality of sensor inputs, such as signals having an image-encoding format and representing a plurality of images, from a plurality of sensors, such as cameras 101 and 102, as in step 211. As further indicated in flowchart 200, multi-sensor mediator 103 is further configured to generate a composite signal that encodes the plurality of sensor inputs from the plurality of sensors, such as by representing a combination of the images from the cameras 101 and 102, as in step 213. Multi-sensor mediator 103 is further configured to provide the composite signal to a sensor controller, such as image sensor controller 105, as in step 215; and to generate an output based at least in part on the composite signal, such as the video images provided on video monitors 121, as in step 217. Different embodiments of the process of flowchart 200 may include additional steps, such as steps for the sensor controller to process the composite signal and relay it to other system elements, prior to ultimately generating an output. For example, the sensor controller may compress the image information from the composite signal and send a compressed signal to other system elements, and other system elements may perform actions of decompressing the image and/or performing other modifications to the image prior to generating a video output on a video monitor.

Figure 3:
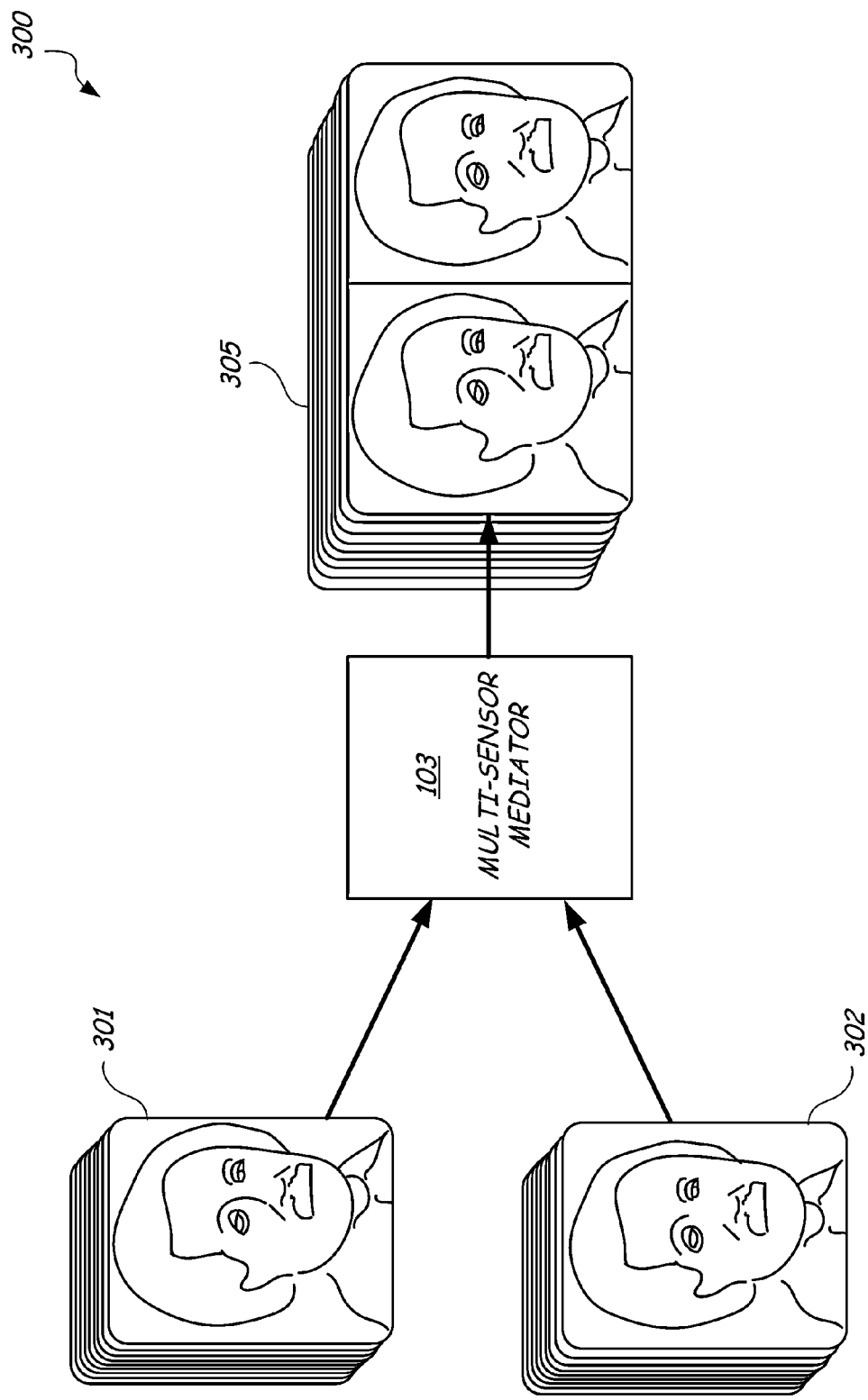
FIG. 3 depicts a method for multiple sensor input data synthesis, according to an illustrative embodiment.

FIG. 3 depicts a schematic representation 300 of the images encoded by the signals from cameras 101 and 102 being used to generate a single composite signal that encodes the multiple images. A time-ordered series of images 301 may be recorded by camera 101, which provides a signal representing those images to multi-sensor mediator 103. Another, simultaneous time-ordered series of images 302 may be recorded by camera 102, which provides a signal representing those images to multi-sensor mediator 103.

Multi-sensor mediator 103 may then combine or synthesize the simultaneous signals, or data streams, from cameras 101 and 102. One illustrative way of combining the data streams from the two separate cameras is by combining the images from the multiple cameras for a single time frame into a single image, so that the signal (i.e. data stream) provided by multi-sensor mediator 103 provides a single, larger image for each time frame.

As depicted in FIG. 3, multi-sensor mediator 103 provides an output composite signal (directed to the sensor controller 105, not depicted in FIG. 3) that encodes a time-ordered series of images, each of which includes encodes the images received from cameras 101, 102 at one time as one composite image. As depicted in the illustrative example in FIG. 3, the composite images 305 each include the original images 301, 302 spaced horizontally adjacent to each other.

For example, in one illustrative embodiment, the cameras may each provide an output encoding a time-ordered sequence of images of 640 by 480 pixels, and the multi-sensor mediator 103 may combine these multiple image streams into a single time-ordered stream of images of 1280 by 480 pixels, consisting of the images from the two original image streams spaced horizontally adjacent to each other. Any other pattern for encoding the multiple sensor inputs into a single composite output may also be used, such as spacing the images vertically adjacent to each other, or interspersing the original images in separate sections by lines or pixels, for example.

Additionally, while two cameras 101, 102 and two sensor input streams 301, 302 are depicted in the illustrative embodiments of FIGS. 1 and 3, other embodiments may include any number of cameras or other sensors, and any number of sensor input signals. For example, a time-slice photography arrangement, an interferometric or segmented telescope, or a positron emission tomography (PET) scintillator, for example, may include tens, hundreds, or thousands of imaging elements with shared or associated imaging fields, and their inputs may advantageously be combined by a sensor intermediary device into a composite signal that is then provided to a sensor controller.

The single composite signal that encodes a combination of the sensor inputs may then be provided by multi-sensor mediator 103 to the sensor controller 105 (as in FIG. 1) as if it were the output of a single sensor. The output of the sensor controller 105 to the core components of the computing device 110, such as processing unit 115, may then be processed to recover the information from the original, separate sensor outputs. This is in stark differentiation from previous systems, which typically include a sensor controller immediately connected to each sensor and relaying the signals from its own sensor, with the various sensor controllers all connected to a single hub, such as an n-port Universal Serial Bus (USB) hub, such that the sensor controllers compete with each other for bandwidth, synchronization of the multiple sensor data streams at the processing unit is difficult if not impossible, and one or more sensor controllers may be denied any bandwidth at all for significant periods of time, potentially causing catastrophic failure of the signal processing from all the sensors. In contrast, the multi-sensor mediator 103 provides performance advantages such as ensuring that the inputs from the various sensors at the same time are inherently delivered to the processing unit of the computing device together and with their time synchronization preserved, according to the present illustrative embodiment.

Advantages such as those described above may make the difference in enabling successful implementation in applications that require a near-real-time, reliably synchronous stream of multiple images, such as generating a video output with stereo projection, as a time-ordered sequences of images based on the composite signals. The stereo representation may be provided by comparing the image components from the different sensors to evaluate distances of different objects from the cameras or other sensors, and represent the objects in different formats in the output images as a function of their distances from the cameras or other sensors, in this illustrative embodiment. The stereo representation of the output images may combine original images received by two, three, four, or any other number of sensors.

As an example, computing systems 100A, 100B may distinguish between foreground objects and background objects in the images originally received from cameras 101, 102, and incorporate distinctions between the foreground objects and the background objects in the output images provided in video monitors 121. In one illustrative example, these distinctions between foreground and background objects may take the form of the output images comprising the foreground objects combined with a background image derived from a source other than the images originally received from the image sensors. In other words, the components of the original images determined to constitute background objects may be removed from the images and replaced with a freely selected background, such as an exotic location or an animated scenario, for example. The information from the composite signal may also be subjected to pattern recognition mechanisms, such as face recognition applied to the foreground image of a user and/or other images corresponding to human faces that occur in the input images encoded in the composite signal. The imported background and other artificial image components may be selected based at least in part on the results of the face recognition, such as to automatically provide image component options previously selected by a user for output images of the user, in one illustrative embodiment.

The stereo representation may also be provided by using an image sensor to capture a scene illuminated with light of a first polarization angle and from another sensor capturing the same scene using an illumination source with light of a second polarization angle, such as a polarization orthogonal to the first polarization, in an illustrative embodiment. In other illustrative embodiments, the different image components from the different sensors may be captured by different camera systems which use different wavelengths of light to illuminate the scene, for example, with either one wavelength or several wavelengths from across the visible spectrum assigned uniquely to the image components from each of the cameras or other sensors. Any number of different cameras may be used to capture original images at any number of different polarizations or wavelengths. The stereo projection, with the image components of different cameras provided in different formats such as different polarizations or wavelengths, may be used to render an output image with a three-dimensional appearance, such as by maintaining the binocular depth perception captured by the input cameras 101, 102 in the output image, using a mechanism of differentially distributing the binocular inputs as binocular outputs directed in separate outputs to each of the user's eyes, for example. The binocular outputs may be provided, for example, by active monitoring of the user's gaze and active projection of the differential images into the user's eyes; by binocular video output goggles or a binocular video output scope; or by binocular filters worn or otherwise used by the user, configured to filter the polarizations, wavelengths, and/or other mechanisms of differential output used to maintain the binocular images from the multiple input cameras.

Figure 4A:
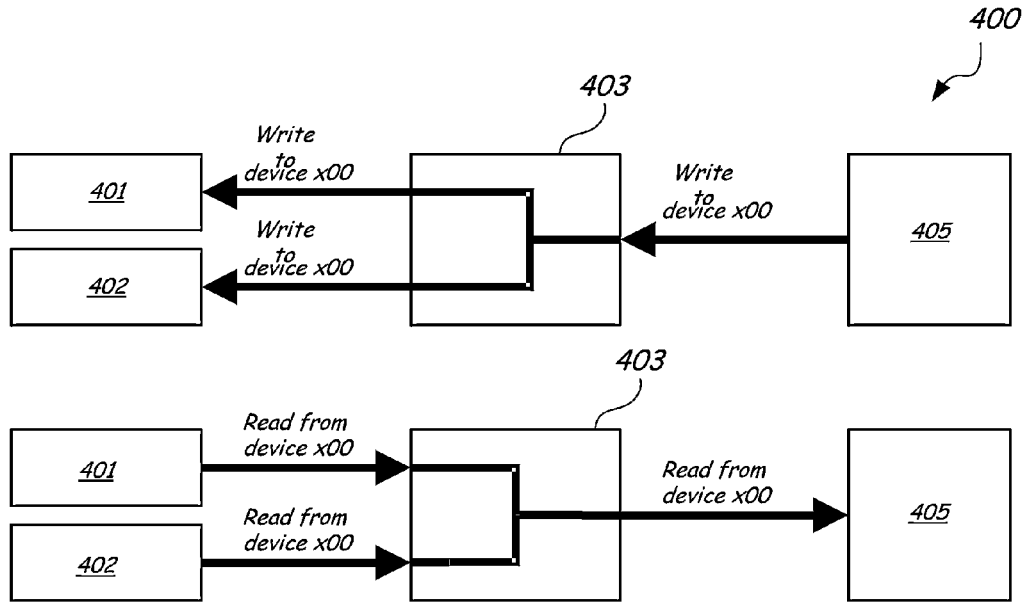
FIGS. 4A and 4B depict multi-sensor input management systems comprising multi-sensor mediators, according to illustrative embodiments.

FIG. 4A depicts multiple sensor system 400 with multi-sensor mediator 403 in communicative connection with two image sensors 401, 402 and a sensor controller 405 according to one illustrative embodiment. Multi-sensor mediator 403 may be embodied as an integrated circuit, for example. In this embodiment, the multi-sensor mediator 403 combines the signals from the image sensors 401, 402 into a composite signal and associates the composite signal with a single device address, indicated as x00, prior to providing the composite signal to the sensor controller 405. The device address can include any indicator of a particular device or element that facilitates communicating with a particular device, in different embodiments. In one illustrative embodiment, the single device address for the multi-sensor mediator 403 may be a slave address in the Inter-Integrated Circuit ($I^2C$) bus protocol, to which the sensor controller 405 directs its instructions, while the sensor controller 405 may have an $I^2C$ master address to which the multi-sensor mediator 403 directs the composite signal, for example. The multi-sensor mediator 403 may then serve as a bus switch, having both a slave node interface and a master node interface, and relay the instructions it receives at the single $I^2C$ slave address to the separate sensors 401, 402 and potentially additional sensors, relaying the same message to slave addresses associated with each of the sensors, as depicted in FIG. 4A.

Figure 4B:
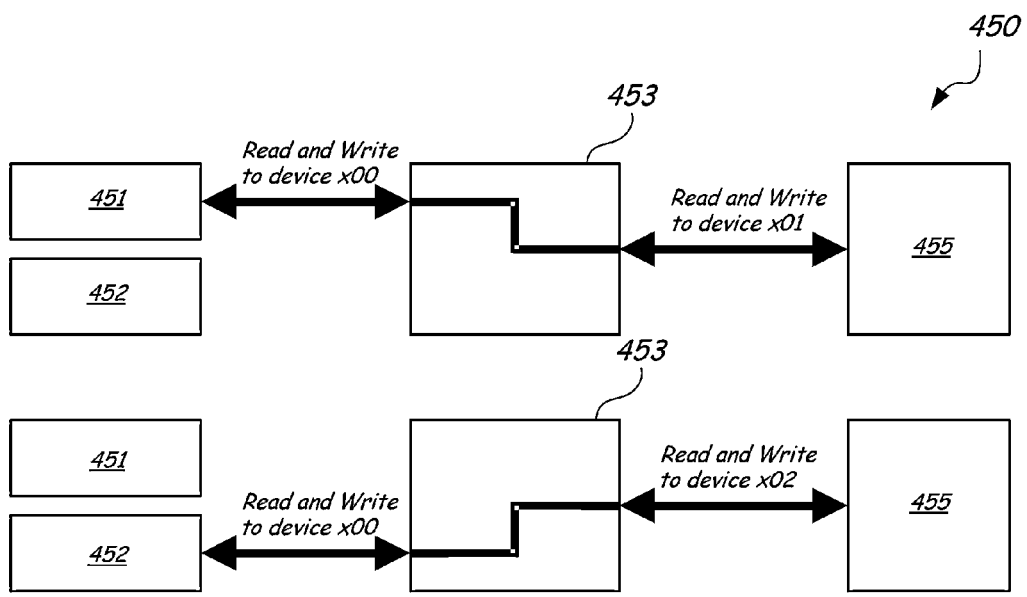

FIG. 4B depicts multiple sensor management system 450 according to another embodiment in which image sensors 451 and 452 have different settings, and multi-sensor mediator 453 is capable of receiving different sets of instructions from sensor controller 455 addressed to individual image sensors, and relaying those individual instructions to the particularly addressed image sensors. In one illustrative embodiment, this may be accomplished by providing instructions from sensor controller 455 addressed to a single $I^2C$ slave address corresponding with multi-sensor mediator 453, but with those instructions encoding different sets of instructions indicated, as with the illustrative address markers x01 and x02 in FIG. 4B, for application to a subset of the available sensors. Multi-sensor mediator 453 is configured to interpret and separate the instructions with the distinct address markers into different sets of instructions that it respectively sends to different $I^2C$ slave addresses corresponding with one or more subsets of the sensors connected to it, where each subset may include one or more individual sensors. This mode of communication between the different components thereby enables separate instructions to be provided to each of the available sensors, enabling additional capabilities for controlling the collection of sensor inputs.

In another illustrative embodiment, image sensor controller 455 may be configured to communicate to multi-sensor mediator 453 a request for a resolution level equivalent to a multiple of the resolution of an individual one of the image sensors 451, 452. For example, the individual image sensors 451, 452 may each have the standard VGA resolution of 640 by 480 pixels, and the image sensor controller 455 may be configured to send a request to the multi-sensor mediator 453 for a resolution level of either 640×480 or 1280×480 pixels, corresponding to a multiple of either one times, or two times, the resolution of one of the individual image sensors 451, 452. The multi-sensor mediator 453 may also be further configured to provide an appropriate signal back to image sensor controller 455 that is responsive to the requested resolution. That is, multi-sensor mediator 453 may be configured to send either the original signal from a single one of the image sensors, representing images from just that one image sensor, if the image sensor controller requests a resolution level equivalent to one of the image sensors; while multi-sensor mediator 453 is also configured to send a composite signal, representing a combination of the images from a number of the image sensors having a combined resolution equivalent to the resolution level requested by the image sensor controller 455, if the image sensor controller 455 requests a resolution level that is higher than the resolution of one of the image sensors.

For instance, if the image sensor controller 455 sends a request for a resolution level of 1280×480, which is higher than the resolution of a single image sensor and is equivalent to the resolution from two image sensors, such as image sensors 451 and 452, the multi-sensor mediator 453 is configured so that it may provide a composite signal that stitches together or combines the images from the two image sensors 451 and 452 in response to that resolution request. The requested resolution may also be a larger multiple of the resolutions of the individual image sensors. For example, the image sensor controller may send a request for a resolution of 1920×480 or 640×1340, for example. In these cases, where a third image sensor is also communicatively connected to multi-sensor mediator 453, multi-sensor mediator 453 may be configured to generate a composite image that stitches together the images from three image sensors, for a combined resolution of 1,920 by 480 pixels, or 640 by 1,340 pixels, as the case may be. The software hosted on a computing device to which image sensor controller 455 is connected may then be configured to translate the composite image to gain the information from each of the three image sensors.

The image sensor controller 455 may also send requests for any other level of resolution, equal to the multiple of two, three, four, or more sensors, which may include sensors of varying resolution, and may specify a certain pattern for how that resolution is encoded, and the multi-sensor mediator may respond by providing a composite signal of that resolution. This may also include the image sensor controller 455 sending a request for a resolution that does not match an integer multiple of the resolution of the individual sensors connected with multi-sensor mediator 453, and multi-sensor mediator 453 may respond by sending a composite signal that includes partial information from one or more of the sensors connected to it, in order to match the requested resolution from the image sensor controller 455.

In any of these embodiments, the sensor controller may receive the composite signal from its multi-sensor mediator, where the composite signal incorporates combined information from the sensors. The sensor controller in turn may provide a processed signal based on the composite signal to other computing system components, such as a processing unit, enabling output to be generated based at least in part on the composite signal. The processed signal may take the form of a Universal Serial Bus (USB) protocol signal, in one exemplary embodiment, where the sensor controller acts as a single, sole USB device that is registered to the operating system of the computing system, thereby inherently delivering the inputs from the multiple sensors in a synchronous and coordinated signal, rather than having multiple sensor controllers associated with each of the sensors competing for USB bandwidth. The USB bandwidth is thereby more efficiently utilized because of reduction of transfer overhead, and bandwidth allocated to the one registered sensor controller will be shared equally among all of the associated image sensors, in this illustrative embodiment.

Additional functions may also be introduced by using the multi-sensor mediator with multiple cameras. For example, another function that may be performed is exposure banding. In exposure banding, two or more cameras use different levels of light exposure for recording images. The different images may then be compared, and bits or other portions of the original images may be selected for having the best light exposure. This may be used, for example, if a relatively dimly lit subject is in front of a relatively harshly lit background. In this case, portions of the images dealing with the foreground subject may be taken from one camera that is relatively overexposed, and portions of the images that contain the background may be taken from another camera that is relatively underexposed. These foreground and background image portions may then be combined into a single image in which the foreground subject and the background are both properly exposed. Such exposure banding may be done not only with two cameras but with any larger number of cameras, each of which may be set to a different exposure sensitivity, with a larger number of cameras enabling finer gradations in exposure selectiveness.

Yet another mechanism that may be enabled by the combination of the multi-sensor mediator with multiple cameras is object tracking. One or more cameras may be configured for a wide field of view, which may record an entire scene, while another camera or cameras may track one or more individual objects that occur within the wider field of view, and which may move around within the wider field of view. The tracking cameras may be configured to record particular objects of interest, such as an active speaker, with a higher resolution, for example, and may be used for special applications such as motion-tracking input, in one illustrative embodiment. These are some of the examples of a wide range of applications that are enabled or facilitated by the multi-sensor mediator of the present disclosure.

Figure 5:
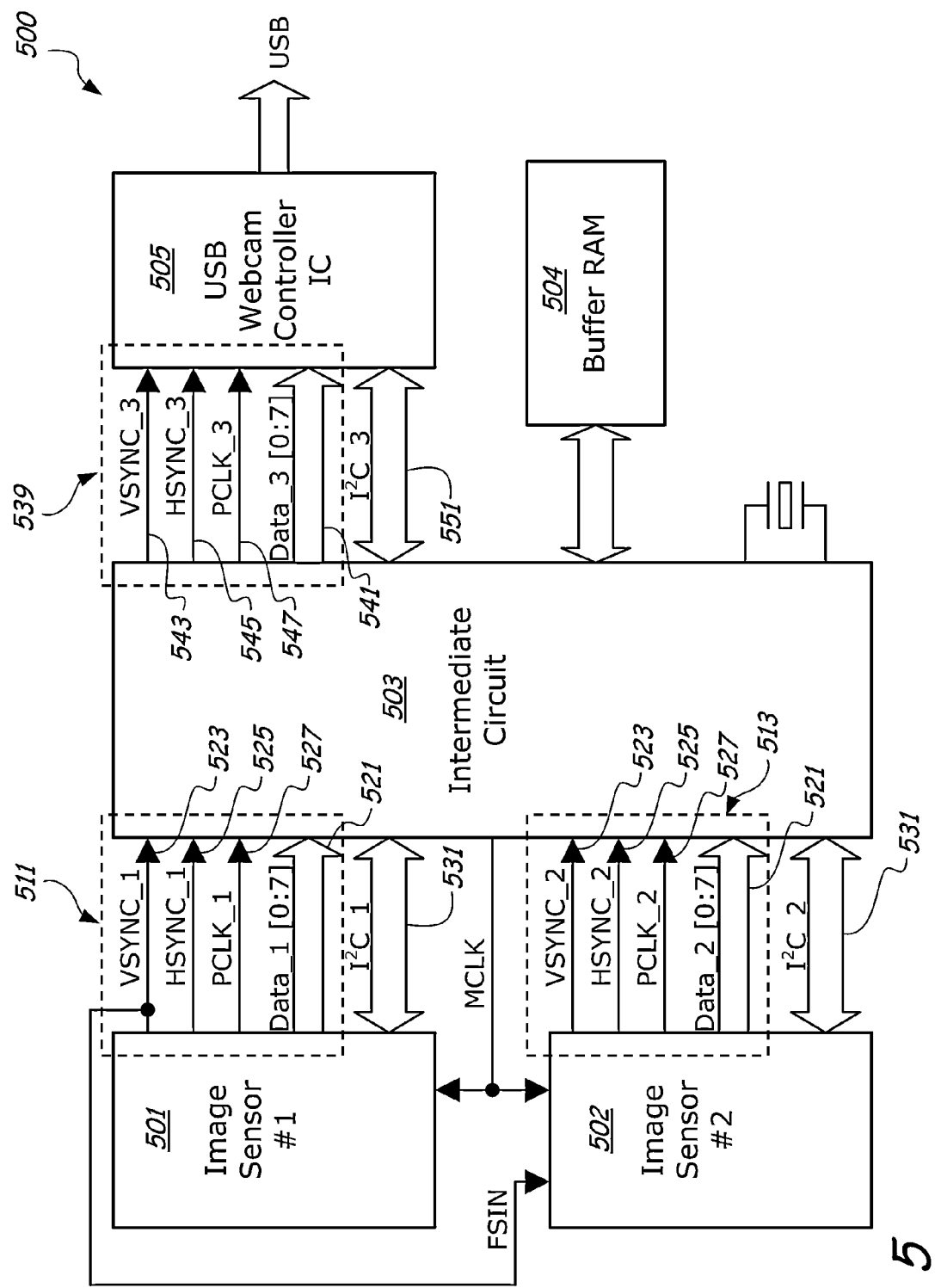
FIG. 5 depicts a multi-sensor input management system comprising a multi-sensor mediator, according to an illustrative embodiment.

FIG. 5 depicts another illustrative embodiment of a multiple sensor management system 500 according to another embodiment, and with a greater level of detail provided. Multiple sensor management system 500 includes image sensors 501 and 502, multi-sensor mediator circuit 503, buffer random access memory (RAM) 504, and sensor controller 505, in this illustrative embodiment. Multi-sensor mediator circuit 503 serves as one illustrative embodiment of a multi-sensor mediator component. Multi-sensor mediator circuit 503 includes a plurality of input blocks 511, 513, wherein each of the input blocks comprises a video input (Data_n) port 521, a vertical synchronization (VSYNC_n) input 523, a horizontal synchronization (HSYNC_n) input 525, and a pixel clock (PCLK_n) input 527 (where "n" refers to a particular one of the sensor inputs, e.g. n=1, 2, etc.). Multi-sensor mediator circuit 503 also includes a master device bus ($I^2C$_n) protocol interface 531 associated with each of the input blocks 511, 513. Each of input blocks 511, 513 and their associated master device bus protocol interfaces 531 are connected to one of the image sensors 501, 502.

Multi-sensor mediator circuit 503 further includes an output block 539, which includes a video output port 541, a vertical synchronization output 543, a horizontal synchronization output 545, and a pixel clock output 547. Multi-sensor mediator circuit 503 also includes a slave device bus protocol interface 551 associated with the output block 539. Output block 539 and slave device bus protocol interface 551 are connected to sensor controller 505, which may illustratively be a USB webcam controller integrated circuit, for example.

Sensor controller 505 may then control the image sensors 501, 502 via the I$^2$C interface, by writing operating parameters into various internal registers of the image sensors. When the image sensors are set into image streaming mode, they will start the recurring processing of exposing their light sensitive pixels for a pre-set duration, converting the analog voltage output of each pixel into digital data, and streaming the digital data to the multi-sensor mediator circuit 503 via the digital video input ports 521. The multi-sensor mediator circuit 503 may then synthesize the separate video input data streams into a composite signal encoding composite images combining the synchronized inputs to the different image sensors, and direct the composite signal to sensor controller 505, in this illustrative embodiment.

Besides the actual image data lines, the image sensors also drive the vertical synchronization (VSYNC) input 523, horizontal synchronization (HSYNC) input 525, and pixel clock (PCLK) input 527. VSYNC is use to indicate the start of each image frame, HSYNC is used to indicate the start of each horizontal image line, and PCLK is the pixel clock indicating that there is valid data on the data lines. The image sensors 501 and 502 may support a frame synchronization operation mode across multiple sensors, in this illustrative embodiment. By tying the VSYNC output of first image sensor 501 to the synchronize input (FSIN) of second image sensor 502, both image sensors 501, 502 will operate synchronously. This feature simplifies the design requirements for multi-sensor mediator circuit 503, as well as ensuring better performance of the software image processing for the computing system decoding the information from the composite signal, as relayed by the sensor controller 505.

Figure 6:
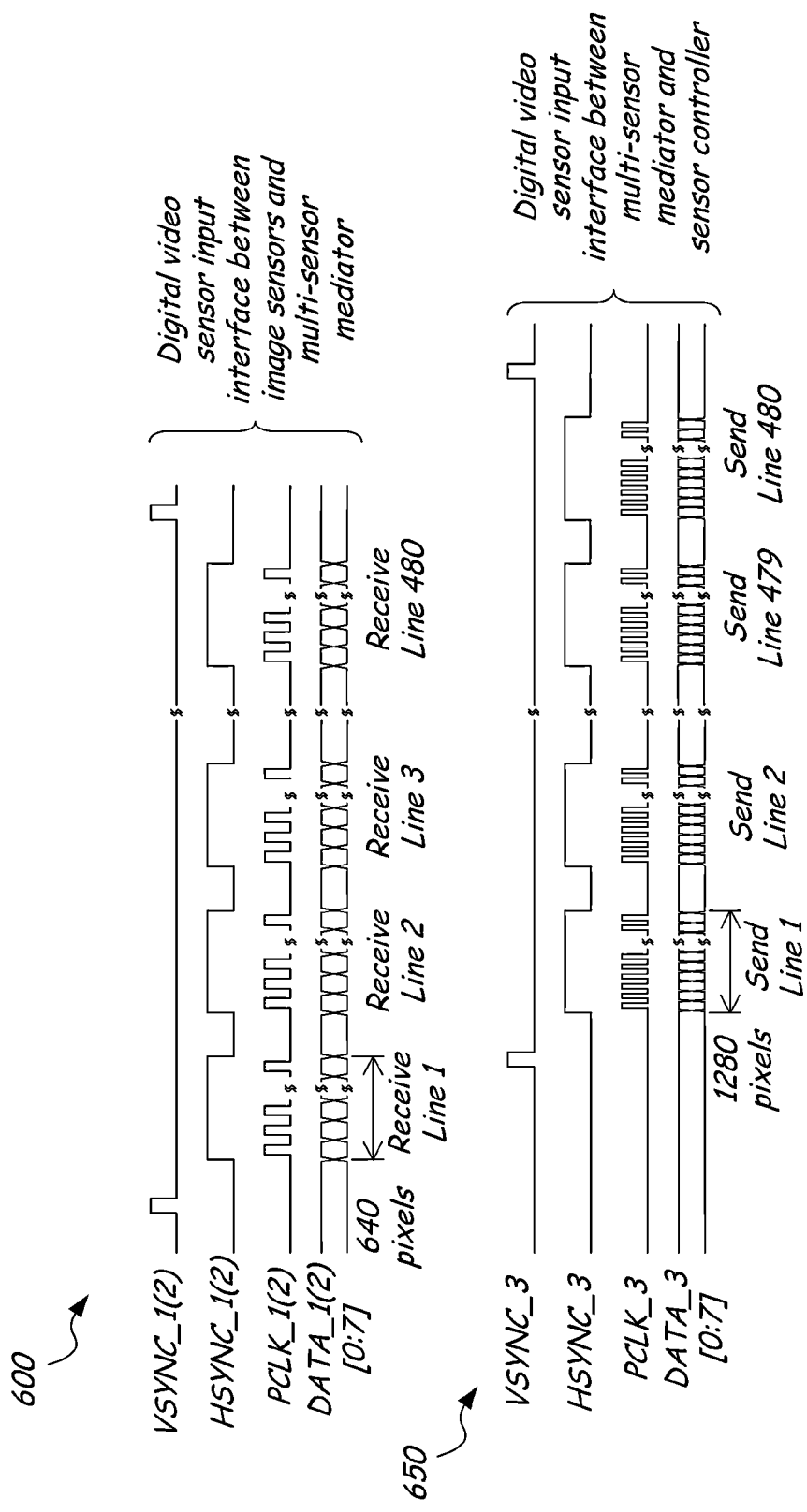
FIG. 6 depicts timing diagrams for sensor input signals and a multi-sensor input composite signal, according to an illustrative embodiment.

Video input port 521, vertical synchronization input 523, horizontal synchronization input 525, and pixel clock input 527 of each of the input blocks 511, 513 enable the transmission of a data signal encoding the images recorded by the associated image sensor, to the multi-sensor mediator circuit 503, in this illustrative embodiment. Similarly, video output port 541, vertical synchronization output 543, horizontal synchronization output 545, and pixel clock output 547 enable the transmission of the composite signal encoding the combined images recorded by the image sensors 501, 502 to the sensor controller 505, in this illustrative embodiment. One illustrative example of the signals that may be provided by these components is depicted in FIG. 6, below.

Buffer RAM 504 may be embodied in a separate component as depicted in FIG. 5, or multi-sensor mediator 503 may include its own internal buffer RAM that performs a similar function, in various illustrative embodiments. Buffer RAM 504 may illustratively contain four logical sections of 640 pixels, labeled A, B, C and D respectively, in this exemplary embodiment. During image streaming, the multi-sensor mediator circuit 503 may perform the following steps, according to one illustrative embodiment:

1. Write odd numbered image lines from image sensor 501 into section A and write odd numbered image lines from image sensor 502 to section B.

2. Write even numbered image lines from image sensor 501 into section C and write even numbered image lines from image sensor 502 to section D.

3. While data is being written into sections A and B (odd numbered line), send image data in sections C and D as a single even numbered image line to the sensor controller 505, and while data is being written into sections C and D (even numbered line), send data in sections A and B as a single odd numbered image line to the sensor controller 505.

4. The composite signal has twice the resolution of the sensor input signals; data sent to the sensor controller 505 has to happen at twice the rate data is received from the individual image sensors 501, 502.

For embodiments using three, four, or more coordinated sensors, the resolution is correspondingly three, four, or more times higher, and the data rate from the multi-sensor mediator circuit 503 to the sensor controller 505 must be correspondingly higher. The multi-sensor mediator circuit 503 should generate the necessary VSYNC, HSYNC and PCLK signals to deliver the image data to the sensor controller 505 at the required rate.

FIG. 6 depicts a timing diagram for the various components of each sensor input signal 600 provided by the respective image sensors to the multi-sensor mediator, according to one illustrative embodiment. FIG. 6 also depicts a timing diagram for the various components of the composite signal 650 provided by the multi-sensor mediator to the sensor controller, according to one illustrative embodiment.

As can be seen in FIG. 6, the pixel clock component of composite signal 650 has twice as many cycles per cycle of the horizontal synchronization signal component of composite signal 650, compared with the number of pixel clock cycles per horizontal synchronization cycles of the sensor input data signal 600. This is indicative of the composite signal encoding multiple VGA image input signals of 640 by 480 pixels as a single image-encoded data signal corresponding to an image of 1280 by 480 pixels, that is, encoded with each of the input images of the same time stamp being composed into a single, larger image with the original images spaced horizontally adjacent to each other. Other encoding protocols may be used by a multi-sensor mediator in other examples, such as vertically adjacent spacing of two VGA input signals, for a composite signal encoding a data stream of 640 by 960 pixel images; or composite signals that encode multiple images interspersed by line or by pixel, or that encode images from three or more image sensors, for example.

Figure 7:
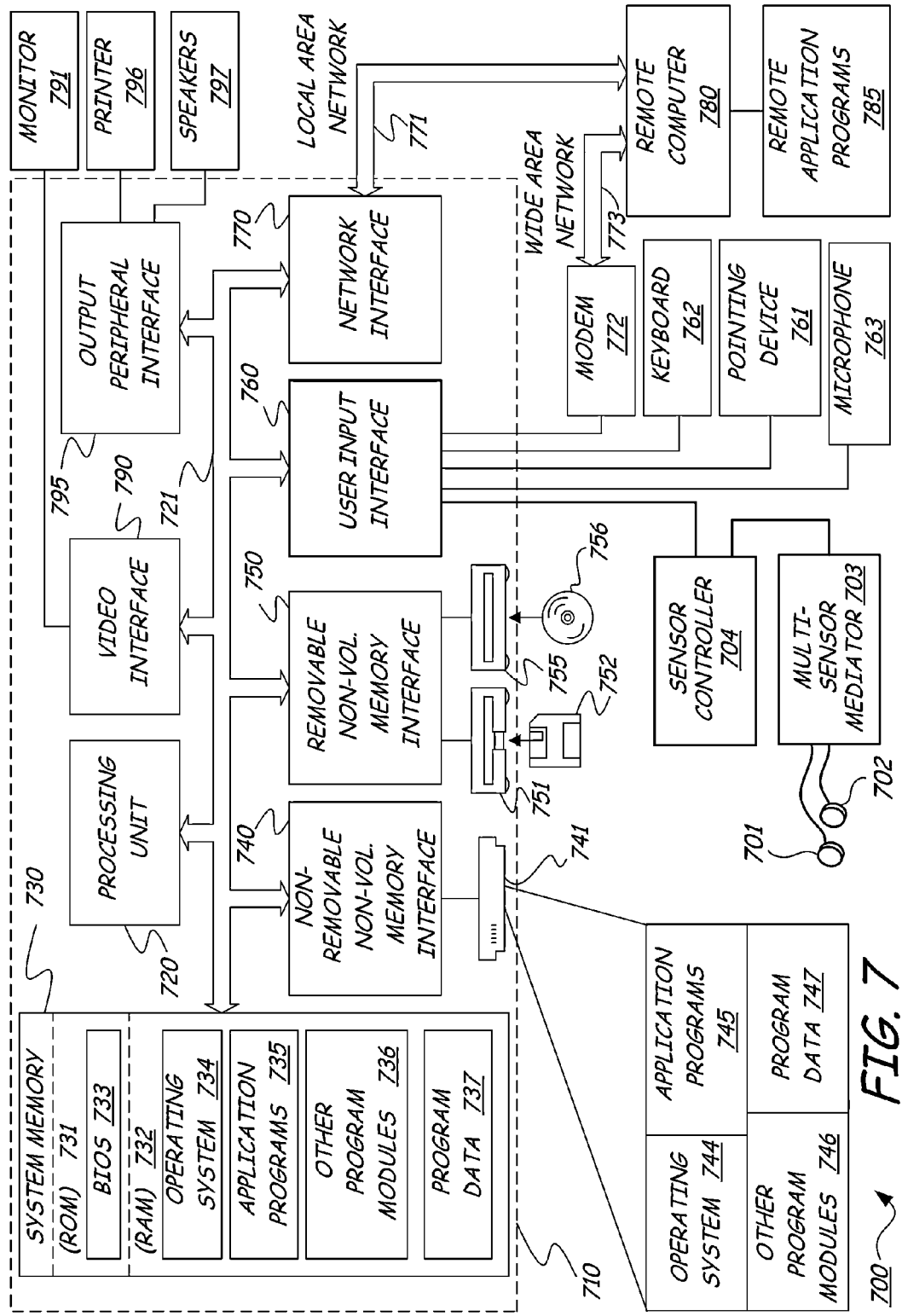
FIG. 7 depicts a computing environment that comprises devices according to an illustrative embodiment and enables methods according to an illustrative embodiment.

FIG. 7 illustrates an example of a suitable computing system environment 700 on which various embodiments may be implemented. According to one illustrative embodiment, computing system environment 700 may be configured to enable the operation of a multi-sensor mediator 703 and associated methods for multiple sensor input data synthesis, such as those depicted in FIGS. 1-6 and described above. For example, a multi-sensor input management system that includes multiple sensors 701, 702, a multi-sensor mediator 703, and a sensor controller 704, may be connected to user input interface 760 of FIG. 7 (further described below). Computing system environment 700 may be configured with corresponding software stored on system memory 730 and running on processing unit 720, for decoding the composite signals and/or processed versions of the composite signals to interpret and manipulate the information from the separate sensor inputs, and to generate outputs based on the composite signal. The computing system environment 700 may illustratively be configured to provide those outputs via video interface 790 and monitor 791, and additional components not depicted in FIG. 7 for providing modes of output such as stereo video and three-dimensional video representations, as discussed above, for example.

For example, various embodiments may be implemented as software applications, modules, or other forms of instructions that are executable by computing system environment 700 and that configure computing system environment 700 to perform various tasks or methods involved in different embodiments. A software application or module embodying a collocation error proofing embodiment may be developed in any of a variety of programming or scripting languages or environments. For example, it may be written in C#, F#, C++, C, Pascal, Visual Basic, Java, JavaScript, Delphi, Eiffel, Nemerle, Perl, PHP, Python, Ruby, Visual FoxPro, Lua, or any other programming language. It is also envisioned that new programming languages and other forms of creating executable instructions will continue to be developed, in which further embodiments may readily be developed.

Computing system environment 700 as depicted in FIG. 7 is only one example of a suitable computing environment for executing and providing output from various embodiments, and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 7, an exemplary system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another illustrative example, references are made herein to different components being communicatively connected with each other, and this may refer either to a wired connection, a wireless connection, or any other means by which different components may be able to communicate information from one to another. As yet another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A computing device comprising:
    a plurality of image sensors including at least a first sensor to capture a scene and a second sensor to track objects within the scene;
    one or more hardware components in communication with the plurality of image sensors, the one or more hardware components configured to perform operations including:
        obtaining inputs from the plurality of image sensors;
        combining the inputs from the plurality of image sensors to form a composite signal that has a resolution that is a multiple of a resolution of images obtained via one or more of the plurality of image sensors and encodes the scene from the first sensor and tracking data from the second sensor in the composite signal; and
        generating an output image based at least in part upon the composite signal.

2. The computing device of claim 1, wherein the output image has a three-dimensional appearance.

3. The computing device of claim 1, wherein the first sensor comprises a camera configured to capture a wide field of view.

4. The computing device of claim 1, wherein the second sensor comprises a tracking camera.

5. The computing device of claim 1, wherein one or more of the plurality of image sensors are used to obtain motion-tracking input to generate the output image.

6. The computing device of claim 5, wherein the motion-tracking input is provided to a controller to cause the controller to produce a processed signal as input to the computing device to enable generation of the output image.

7. The computing device of claim 1, wherein the composite signal is processed to form a universal serial bus (USB) protocol signal for providing input from the plurality of image sensors to the computing device to enable generation of the output image.

8. The computing device of claim 1, wherein the plurality of image sensors enable object tracking by detection of distance differences of objects from the plurality of image sensors.

9. The computing device of claim 1, wherein at least one of the plurality of image sensors is provided as an external sensor connected to the computing device.

10. The computing device of claim 1, wherein at least one of the plurality of image sensors is included within the computing device.

11. The computing device of claim 1, wherein the plurality of image sensors enable facial recognition within the captured scene.

12. The computing device of claim 1, wherein the one or more hardware components are further configured to perform operations to communicate the output image that is generated over a network for display via a display device associated with another computing device.

13. The computing device of claim 1, wherein the one or more hardware components are further configured to perform operations to cause display of the output image that is generated via a display device associated with the computing device.

14. A method implemented by a computing device comprising:
    obtaining inputs from a plurality of image sensors including a wide field camera configured to capture a wide field view of a scene and a tracking camera to track objects within the scene;
    combining the inputs to form a composite signal that has a resolution that is a multiple of a resolution of images obtained via one or more of the plurality of image sensors and encodes the scene from the wide field camera and tracking data from the tracking camera in the composite signal;
    generating an output image based at least in part upon the composite signal; and
    communicating the output image that is generated for at least one of:
        a display connected to the computing device; or
        receipt by another computing device over a network.

15. The method of claim 14, wherein the composite signal is processed to form a universal serial bus (USB) protocol signal for providing input from the plurality of image sensors to the computing device to enable generation of the output image.

16. The method of claim 14, wherein the plurality of image sensors enable facial recognition of the objects tracked within the scene.

17. An image capture device comprising:
    an input interface adapted to obtain inputs from a plurality of image sensors including a first sensor to capture a scene and a second sensor to track objects within the scene;
    a multi-sensor mediator configured to combine the inputs from the plurality of image sensors to form a composite signal that has a resolution that is a multiple of a resolution of images obtained via one or more of the plurality of image sensors and encodes a combination of information from the plurality of image sensors including tracking data from the second sensor; and
    a sensor controller configured to:
        process the composite signal provided by the multi-sensor mediator to produce a processed signal in the form of a universal serial bus (USB) protocol signal; and
        provide the processed signal to an input interface of a computing device to enable processing by the computing device to generate a response to the inputs.

18. The image capture device of claim 17, wherein the image capture device is configured as an integrated component of the computing device.

19. The image capture device of claim 17, wherein the image capture device is configured as external component connectable to the computing device.

20. The image capture device of claim 17, wherein the plurality of image sensors enable facial recognition within the captured scene.

* * * * *